US008783510B2

(12) United States Patent
Reynolds et al.

(10) Patent No.: US 8,783,510 B2
(45) Date of Patent: Jul. 22, 2014

(54) ELECTRONICALLY KEYED DISPENSING SYSTEMS AND RELATED METHODS UTILIZING NEAR FIELD FREQUENCY RESPONSE

(75) Inventors: Aaron R. Reynolds, Canton, OH (US); Mark E. Rosenkranz, Parma, OH (US); Paul Waterhouse, Hamilton (CA)

(73) Assignee: Joseph Kanfer, Richfield, OH (US)

( * ) Notice: Subject to any disclaimer, the term of this patent is extended or adjusted under 35 U.S.C. 154(b) by 214 days.

(21) Appl. No.: 12/358,511

(22) Filed: Jan. 23, 2009

(65) Prior Publication Data

US 2009/0127282 A1 May 21, 2009

Related U.S. Application Data

(62) Division of application No. 11/013,727, filed on Dec. 15, 2004, now Pat. No. 7,621,426.

(51) Int. Cl.

| | |
|---|---|
| ***B67D 7/06*** | (2010.01) |
| ***B67D 7/56*** | (2010.01) |
| ***B67D 1/00*** | (2006.01) |
| ***B67D 7/14*** | (2010.01) |
| ***G01F 11/00*** | (2006.01) |
| ***G01F 13/00*** | (2006.01) |
| ***B65D 88/54*** | (2006.01) |

(52) U.S. Cl.
USPC ............... 222/23; 222/230; 222/325; 222/52; 222/63; 222/321.7

(58) Field of Classification Search
USPC ............... 222/325, 230, 180–183, 23, 52, 63, 222/321.7, 333, 504, 402.1, 321; 141/291, 141/346; 221/289; 116/211, 205
See application file for complete search history.

(56) References Cited

U.S. PATENT DOCUMENTS

| | | | | |
|---|---|---|---|---|
| 4,142,674 | A | 3/1979 | Walton | 235/492 |
| 4,366,481 | A | 12/1982 | Main et al. | 340/825.54 |
| 4,369,481 | A | 1/1983 | Early | 361/173 |
| 4,372,590 | A | 2/1983 | Pilat et al. | 292/33 |
| 4,390,758 | A | 6/1983 | Hendrickson | 200/43 |
| 4,471,905 | A | 9/1984 | Sloma et al. | 232/12 |

(Continued)

FOREIGN PATENT DOCUMENTS

| | | | |
|---|---|---|---|
| EP | 0 679 605 | 3/1995 | B67C 3/30 |
| GB | 2 279 069 | 12/1994 | B65D 47/36 |

(Continued)

*Primary Examiner* — Paul R Durand
*Assistant Examiner* — Vishal Pancholi
(74) *Attorney, Agent, or Firm* — Renner Kenner Greive Bobak Taylor & Weber

(57) ABSTRACT

A dispensing system is disclosed which utilizes an electronically powered key device and/or identification code associated with a refill container to preclude the need for mechanical keys. The system utilizes a near field frequency response to determine whether a refill container is compatible with a dispensing system. In particular, the refill container is provided with a coil terminated by one of a number of capacitors. The container is received in a housing that provides a pair of coils that are in a spatial relationship with the installed refill container's coil. By energizing one of the housing's coils, the other coil detects a unique electronic signature generated by the container's coil. If the signature is acceptable, the dispensing system is allowed to dispense a quantity of material. The system also provides a unique latching mechanism to retain the container and ensure positioning of all the coils.

24 Claims, 14 Drawing Sheets

(56) References Cited

U.S. PATENT DOCUMENTS

| | | | | | |
|---|---|---|---|---|---|
| 4,489,359 | A | | 12/1984 | Suzuki | 361/172 |
| 4,534,194 | A | | 8/1985 | Aydin | 70/278 |
| 4,580,721 | A | | 4/1986 | Coffee et al. | 239/3 |
| 4,602,150 | A | | 7/1986 | Nishikawa et al. | 235/382 |
| 4,629,164 | A | | 12/1986 | Sommerville | 239/69 |
| 4,656,850 | A | | 4/1987 | Tabata | 70/276 |
| 4,673,109 | A | * | 6/1987 | Cassia | 222/153.03 |
| 4,697,171 | A | | 9/1987 | Suh | 340/543 |
| 4,770,012 | A | | 9/1988 | Johansson et al. | 70/278 |
| 4,779,090 | A | | 10/1988 | Micznik et al. | 340/825.31 |
| 4,798,068 | A | | 1/1989 | Nakauchi | 70/276 |
| 4,843,851 | A | | 7/1989 | Frolov | 70/277 |
| 4,849,749 | A | | 7/1989 | Fukamachi et al. | 340/825.31 |
| 4,902,882 | A | | 2/1990 | Lavelle | 235/382 |
| 4,931,789 | A | | 6/1990 | Pinnow | 340/825.56 |
| 4,967,577 | A | | 11/1990 | Gartner et al. | 70/279 |
| 4,974,753 | A | * | 12/1990 | Tucker et al. | 222/181.2 |
| 5,031,797 | A | | 7/1991 | Boris et al. | 222/23 |
| 5,083,113 | A | | 1/1992 | Slawinski et al. | 340/572 |
| 5,100,030 | A | | 3/1992 | Roggenburg, Jr. et al. | 222/181 |
| 5,111,186 | A | | 5/1992 | Narlow et al. | 340/572 |
| 5,209,377 | A | * | 5/1993 | Steiner et al. | 222/189.09 |
| 5,337,588 | A | | 8/1994 | Chhatwal | 70/278 |
| 5,339,662 | A | | 8/1994 | Goldman | 70/278 |
| 5,345,379 | A | | 9/1994 | Brous et al. | 364/146 |
| 5,359,322 | A | | 10/1994 | Murray | 340/825.31 |
| 5,385,039 | A | | 1/1995 | Feldpausch et al. | 70/78 |
| 5,412,372 | A | | 5/1995 | Parkhurst et al. | 340/568 |
| 5,477,984 | A | * | 12/1995 | Sayama et al. | 222/52 |
| 5,541,581 | A | | 7/1996 | Trent | 340/825.31 |
| 5,550,529 | A | | 8/1996 | Burge | 340/296 |
| 5,579,888 | A | | 12/1996 | Slyper | 194/350 |
| 5,635,917 | A | | 6/1997 | Todman | 340/825.37 |
| 5,681,070 | A | | 10/1997 | Williams et al. | 292/341.16 |
| 5,691,711 | A | | 11/1997 | Jorgensen | 340/825.31 |
| 5,718,135 | A | | 2/1998 | Bertenshaw et al. | 70/278 |
| 5,738,153 | A | | 4/1998 | Gerling et al. | 141/83 |
| 5,771,722 | A | | 6/1998 | DiVito et al. | 70/278 |
| 5,782,814 | A | | 7/1998 | Brown et al. | 604/207 |
| 5,836,482 | A | * | 11/1998 | Ophardt et al. | 222/325 |
| 5,839,305 | A | | 11/1998 | Aston | 70/278 |
| 5,842,603 | A | | 12/1998 | Schroeder et al. | 222/23 |
| 5,875,921 | A | | 3/1999 | Osgar et al. | 222/1 |
| 5,907,493 | A | | 5/1999 | Boyer et al. | 264/479.01 |
| 5,911,250 | A | | 6/1999 | Turker et al. | 141/94 |
| 5,997,928 | A | | 12/1999 | Kaish et al. | 426/418 |
| 6,005,487 | A | | 12/1999 | Hyatt, Jr. et al. | 340/825.31 |
| 6,038,896 | A | | 3/2000 | Chamberlain et al. | 70/279.1 |
| 6,047,807 | A | | 4/2000 | Molbak | 194/217 |
| 6,070,761 | A | | 6/2000 | Bloom et al. | 222/81 |
| 6,082,153 | A | | 7/2000 | Schoell et al. | 70/1.5 |
| 6,085,560 | A | | 7/2000 | Dalton, Jr. | 70/278.3 |
| 6,181,025 | B1 | | 1/2001 | McConnell et al. | 307/10.2 |
| 6,209,751 | B1 | * | 4/2001 | Goodin et al. | 222/52 |
| 6,275,143 | B1 | | 8/2001 | Stobbe | 340/10.34 |
| 6,304,169 | B1 | | 10/2001 | Blama et al. | 340/10.1 |
| 6,343,724 | B1 | * | 2/2002 | Ophardt et al. | 222/496 |
| 6,375,038 | B1 | * | 4/2002 | Daansen et al. | 222/52 |
| 6,384,711 | B1 | | 5/2002 | Cregger et al. | 340/5.65 |
| 6,385,505 | B1 | | 5/2002 | Lipps | 700/231 |
| 6,390,329 | B1 | * | 5/2002 | Maddox | 222/25 |
| 6,422,422 | B1 | | 7/2002 | Forbes | 222/66 |
| 6,427,504 | B1 | | 8/2002 | Janssen et al. | 70/278.3 |
| 6,431,400 | B1 | | 8/2002 | O'Maley et al. | 222/41 |
| 6,442,986 | B1 | | 9/2002 | Russell et al. | 70/278.3 |
| 6,471,089 | B2 | | 10/2002 | Liff et al. | 221/13 |
| 6,474,122 | B2 | | 11/2002 | Davis | 70/278.3 |
| 6,483,424 | B1 | | 11/2002 | Bianco | 340/5.6 |
| 6,540,157 | B2 | * | 4/2003 | Ophardt | 239/428.5 |
| 6,600,406 | B1 | | 7/2003 | Ha | 340/5.2 |
| 6,607,103 | B2 | * | 8/2003 | Gerenraich et al. | 222/183 |
| 6,626,355 | B2 | | 9/2003 | Sasse et al. | 235/375 |
| 6,649,829 | B2 | | 11/2003 | Garber et al. | 174/47 |
| 6,693,540 | B2 | | 2/2004 | Gershenfeld et al. | 340/572.4 |
| 6,772,944 | B2 | | 8/2004 | Brown | 235/376 |
| 6,929,150 | B2 | | 8/2005 | Muderlak et al. | 222/1 |
| 7,009,519 | B2 | * | 3/2006 | Leonard et al. | 340/572.8 |
| 2001/0020148 | A1 | | 9/2001 | Sasse et al. | 604/65 |
| 2002/0014950 | A1 | | 2/2002 | Ayala et al. | 340/5.6 |
| 2002/0155033 | A1 | | 10/2002 | Strand et al. | 422/101 |
| 2002/0189667 | A1 | * | 12/2002 | O'Dougherty et al. | 137/1 |
| 2003/0036201 | A1 | * | 2/2003 | Nelson et al. | 436/56 |
| 2003/0193398 | A1 | | 10/2003 | Geber et al. | 340/568.1 |
| 2004/0104241 | A1 | | 6/2004 | Broussard et al. | 221/289 |

FOREIGN PATENT DOCUMENTS

| | | | |
|---|---|---|---|
| JP | 75821/92 | 4/1994 | B65D 47/34 |
| JP | 2001-126158 | 5/2001 | G08B 13/24 |
| JP | 2001-134729 | 5/2001 | G06X 19/07 |
| JP | 2002-185358 | 6/2002 | H04B 1/59 |
| WO | WO 96/13293 | 10/1995 | A62M 11/00 |
| WO | WO 96/36556 | 11/1996 | B67D 1/00 |
| WO | WO 01/80174 | 10/2001 | G06K 19/077 |
| WO | WO 02/094707 | 11/2002 | B67D 5/33 |

* cited by examiner

ELECTRONICALLY KEYED DISPENSING SYSTEMS AND RELATED METHODS UTILIZING NEAR FIELD FREQUENCY RESPONSE

CROSS REFERENCE TO RELATED APPLICATION

This is a divisional application of application Ser. No. 11/013,727 filed Dec. 15, 2004, now U.S. Pat. No. 7,621,426 which is incorporated herein by reference.

TECHNICAL FIELD

The present invention is generally directed to dispensing systems. In particular, the present invention is directed to keyed dispensers which allow only designated refill containers with dispensable material to be installed therein and, if desired, installed by selected distributors. More specifically, the present invention is directed to electronically keyed fluid dispensing systems.

BACKGROUND ART

It is well known to provide fluid dispensers for use in restaurants, factories, hospitals, bathrooms and the home. These dispensers may contain fluids such as soap, anti-bacterial cleansers, disinfectants, lotions and the like. It is also known to provide dispensers with some type of pump actuation mechanism wherein the user pushes or pulls a lever to dispense a quantity of fluid into the user's hands. "Hands-free" dispensers may also be utilized wherein the user simply places their hand underneath a sensor and a quantity of fluid is dispensed. Related types of dispensers may be used to dispense powder or aerosol materials.

Dispensers may directly hold a quantity of fluid, but these have been found to be messy and difficult to service. As such, it is known to use refill bags or containers that hold a quantity of fluid and provide a pump and nozzle mechanism. These refill bags are advantageous in that they are easily installed without a mess. And the dispenser can monitor usage to indicate when the refill bag is low and provide other dispenser status information.

Manufacturers of these fluid materials enlist distributors to install the dispensers at various locations and place the manufacturer's products in the dispensers. Further, the manufacturers rely on the distributors to put the correct refill container in the dispenser housing. For example, it would be very upsetting to hospital personnel to have hand moisturizing lotion dispensed when they instead desire anti-bacterial soap. Therefore, manufacturers provide keyed nozzle and pump mechanisms for each type of fluid refill bag so that only appropriate refill bags are installed in corresponding fluid dispensers.

Distributors prefer such a keying system so that their dispensers can only be refilled by them instead of their competitors. Replacement of refill containers by unauthorized distributors is sometimes referred to as "stuffing." In addition to providing keying between the dispenser and the fluid refill bag to ensure the compatibility of the product with the dispenser, keying is used to ensure that competitors of the distributor do not obtain the distributor's business. And it is also critical to the manufacturer that competitors do not stuff their product into the manufacturer's dispensers. Such activity prevents the manufacturer from obtaining an adequate financial return on the dispensers which are typically sold at cost or less.

Although mechanical keys are helpful in ensuring that the proper refill bag is installed into the proper dispenser and that the distributors maintain their business clientele, these keying systems have been found to be lacking. For example, if a distributor's competitor cannot install their refill packages into the distributor's dispenser device, the competitor may remove or alter the keying mechanism. As such, inferior fluid may be installed into a particular dispenser and the preferred distributor will lose sales. Mechanical keying also necessitates significant tooling costs underwritten by the manufacturer to design special nozzles and dispensers that are compatible with one another. In other words, each dispenser must be keyed for a particular product, a particular distributor and perhaps even a particular location. Accordingly, the inventory costs for maintaining refill bags with a particular key is significant. And the lead time for manufacturing such a refill bag may be quite lengthy. Moreover, the particular identification of a particular keying device may be lost or damaged so that it is difficult to determine which type of keying configuration is needed for the refill bags.

One attempt at controlling the type of product associated with a dispenser is disclosed in U.S. Pat. No. 6,431,400 B1. This patent discloses a refill bag that utilizes a wafer with an embedded magnet that must be properly oriented into a housing in order for the magnet to be detected and effectively close an on/off switch. If the magnet is not detected then the dispenser is disabled. Although effective in its' stated purpose, the device disclosed in the patent is lacking in that a specific orientation is required for installation of the refill container. The patent also discloses the use of a spiral coil on a printed circuit wafer on the bag which is inductively coupled to a similar spiral coil on the housing's base supporting surface. A capacitor connected to the spiral coil on the bag establishes a resonant frequency for a conventional frequency-measuring circuit to provide identification. It is believed that this scheme is lacking in that it provides no teaching for adaptability for use with multiple dispensers. It is also believed that the disclosed configuration is subject to a mis-alignment of the coils which may lead to mis-identification of the bag. And the use of a single coil as the emitting and receiving coils may lead to mis-identification of the bag.

Therefore, there is a need in the art for a dispensing system which provides for exchanges of data between a refill container and a receiving housing. The exchange of data enables an improved keying system that eliminates the significant tooling costs required for each new distributor and for each new product that is required to be associated with a dispenser. There is also a need for an improved keying system for fluid dispensers to ensure that the proper material is installed into the proper dispenser. And there is a need to control the number of refill bags shipped to a distributor to ensure that the distributor is utilizing the proper refill materials. There is a further need for a dispensing system with identifiable refill containers wherein the cost of the refill containers is kept to a minimum. And there is a need for the containers to be received within the dispenser in such a way to ensure positive detection of the container's identifier.

SUMMARY OF THE INVENTION

In view of the foregoing it is a first aspect of the present invention to provide electronically keyed dispensing systems and related methods utilizing near field frequency response.

Another aspect of the present invention, which shall become apparent as the detailed description proceeds, is achieved by a refill container received in a dispensing system, the container including an enclosure for carrying dispensable material, a pump mechanism coupled to the enclosure, a nozzle operatively connected to the pump mechanism, wherein actuation of the pump mechanism dispenses a quantity of material through the nozzle, and an identifier spaced apart from the enclosure, wherein the identifier has one of a selected number of electronic signatures.

Still another aspect of the present invention is to provide a dispensing system, that includes a refill container having a dispensing interface extending axially therefrom, an identification collar disposed about the dispensing interface, and a module for detachably receiving the identification collar and selectively actuating the dispensing interface when the identification collar is deemed compatible by the module.

Other aspects of the present invention are attained by a dispensing system, which includes a housing having an emitting device and a receiving device; a refill container carrying a material and an electronic key, the refill container receivable in the housing; an operational mechanism associated with one of the housing and the refill container; and a controller in communication with the emitting and receiving devices, the controller having a matching key, the emitting device generating a signal which passes through the electronic key and which is received by the receiving device for comparison to the matching key to selectively enable the operational mechanism.

Yet another aspect of the present invention is to provide a container that carries dispensable material for receipt in a dispensing system, the container including a structure for carrying dispensable material, a dispensing interface associated with the structure that facilitates dispensing of a quantity of the dispensable material, and an identifier spaced apart from the structure, wherein the identifier has one of a selected number of electronic signatures.

These and other aspects of the present invention, as well as the advantages thereof over existing prior art forms, which will become apparent from the description to follow, are accomplished by the improvements hereinafter described and claimed.

BRIEF DESCRIPTION OF THE DRAWINGS

For a complete understanding of the objects, techniques and structure of the invention, reference should be made to the following detailed description and accompanying drawings, wherein.

BEST MODE FOR CARRYING OUT THE INVENTION

Figure 1:
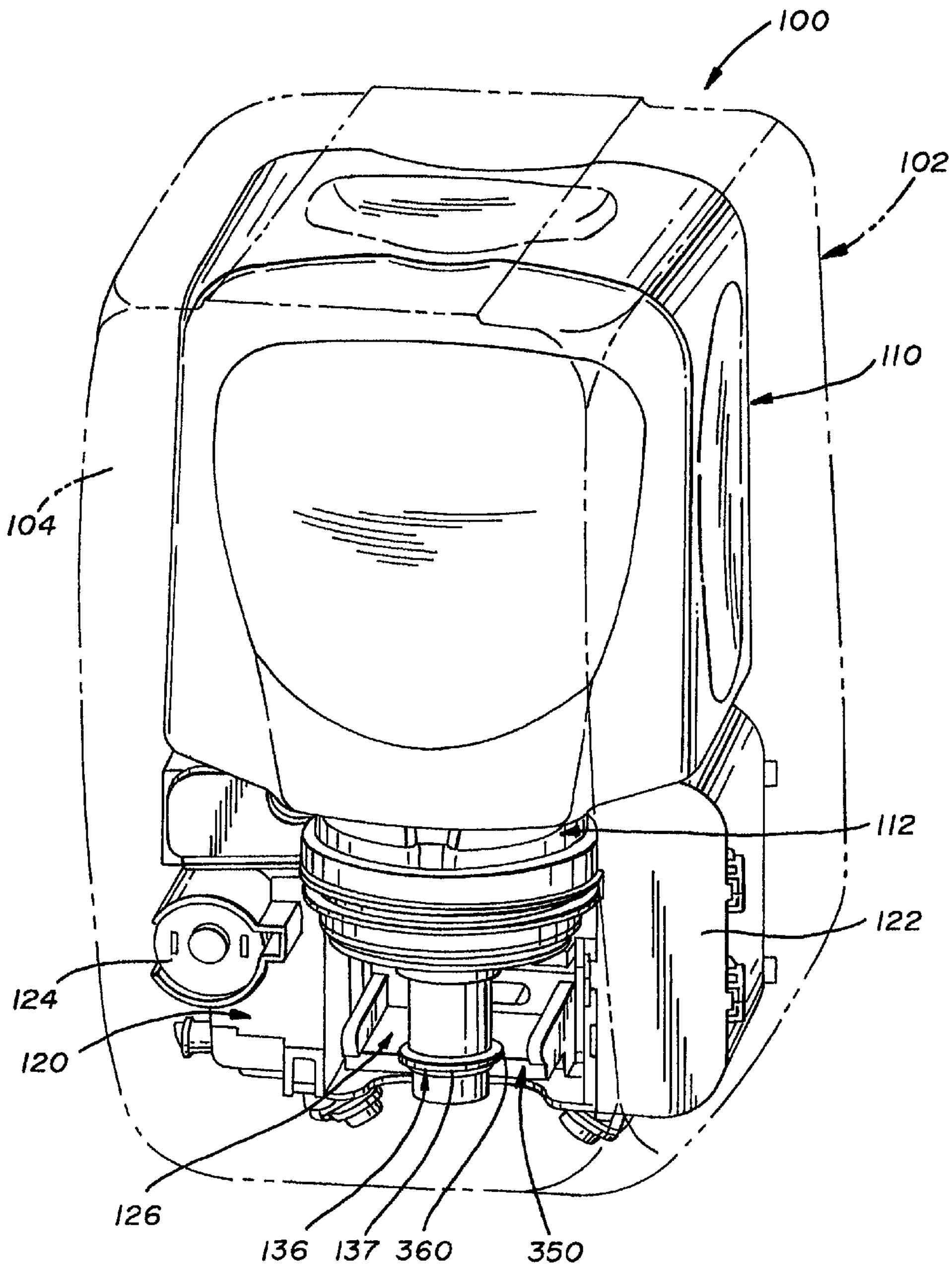
FIG. 1 is a front perspective view of a keyed fluid dispenser made in accordance with the concepts of the present invention.

It will be appreciated from a reading of the Background Art that a primary need for dispensing systems is the ability to prevent "stuffing" of competitor's refill containers in a manufacturer's dispenser or in dispensers serviced by a distributor authorized by the manufacturer. The exemplary system disclosed herein fills this need by facilitating sharing of data between a communication device associated with the refill container and a communication device associated with the dispenser housing. Sharing of data includes, but is not limited to: the type of material within a refill container; a refill container's identification code; a concentration ratio within the refill container; a distributor's identification code; quality control information, such as manufacture dates and lot size; pump and/or nozzle size; the type of pump actuating mechanism associated with a dispenser; the type of dispenser location, such as a restaurant, hospital school, factory, etc.; the dispenser's history of use; and so on. The communication devices referred to may include, but are not limited to: a bar code; a magnetic storage medium; an optical storage medium; radio frequency identification (RF ID) tags or smart labels; and related mediums. Indeed, the communication device may consist of a coil with an attached capacitor.

A microprocessor based controller is associated with either the refill container, or the housing. And a second controller may be used in a stand-alone device so as to add an extra level of security. The primary controller is preferably used to facilitate the sharing of data between the communication devices. And based upon the monitoring of the communication devices undertaken by the controller, the controller controls any number of operational mechanisms that permit use of the dispensing system. The controller may also allow a single dispenser to receive and dispense materials from more than one refill container, or allow control of more than one dispenser.

The stand-alone device may be an electronic plug or key that is receivable by the dispenser housing. Indeed the key may or may not provide: a power supply, the first or second communications device, and the controller. The foregoing features and options may be selected depending upon security features desired by the distributor or manufacturer as deemed appropriate.

The dispenser disclosed herein may either utilize operational mechanisms such as a push bar mechanism or a "hands-free" mechanism for dispensing a quantity of fluid. The push bar mechanism operates by the user pushing a bar that actuates a pump mechanism carried by the refill container to dispense a measured quantity of fluid. The "hands-free" device, an example of which is disclosed in U.S. Pat. No. 6,390,329, and which is incorporated herein by reference, utilizes a sensor that detects the presence of an individual's hand and then dispenses a measured quantity of fluid. The operational mechanism may also include any latching components that permit access to the housing that carries the refill container. In other words, a latch or a series of latches may be used to prevent access to the refill container. If so, then the dispensing system may not be enabled if the controller prevents unlocking of the latch mechanism. Or the controller may be operative with a mechanism that controls a pump associated with the refill container, wherein incompatibility of the communication devices may preclude actuation of the pump.

In order to operate the hands-free dispenser and other dispensers that provide status information it is known to provide a power source, such as low-voltage batteries, within the fluid dispenser housing. Accordingly, the batteries contained within the fluid dispenser may be utilized to operate the controller and a display of a particular dispenser. In other words, the internal power may be utilized to read the communication device provided with the key or the refill container. In the alternative, and as noted previously, the power may be externally provided by the electronic key inserted into the dispenser. This feature saves on providing a power supply with each dispenser and the costs associated with replacing discharged batteries.

The features listed above provide for a dispensing system with significantly improved operational features. Indeed, use of the communication devices and their exchange of information facilitated by the controller provide for not only selective enablement of the system but also monitoring of the system. By collecting additional system information, the needs of the dispenser user, the distributor and the manufacturer can be met. For example, the dispenser's frequency of use can be determined along with peak hours of operation, use within designated time periods and so on. As will be appreciated from the detailed discussion to follow, the various features of the different embodiments may be utilized in any number of combinations and with one or multiple dispensers. Accordingly, reference is made to the following detailed description and figures which set out the preferred embodiment.

Fluid Dispensing System Utilizing a Near Field Frequency Response Key, an Electronic Lock Out System and Internal Power Referring now to FIGS. 1-17, it can be seen that a dispensing system and related methods of use according to the present invention is designated generally by the numeral 100. In this particular embodiment, a near field frequency response system is utilized for the purpose of checking the identification of the inserted refill container upon each and every actuation of the dispensing mechanism.

The system 100 employs a housing 102 (shown in phantom) which is carried by a back plate (not shown). A housing cover 104 is selectively moveable with respect to the back plate. The cover 104 may be hinged, latched or otherwise coupled to the back plate so as to allow replacement of refill containers and maintenance of the housing's internal workings. It will also be appreciated that a latching mechanism between the cover may be motor driven.

Figure 1A:
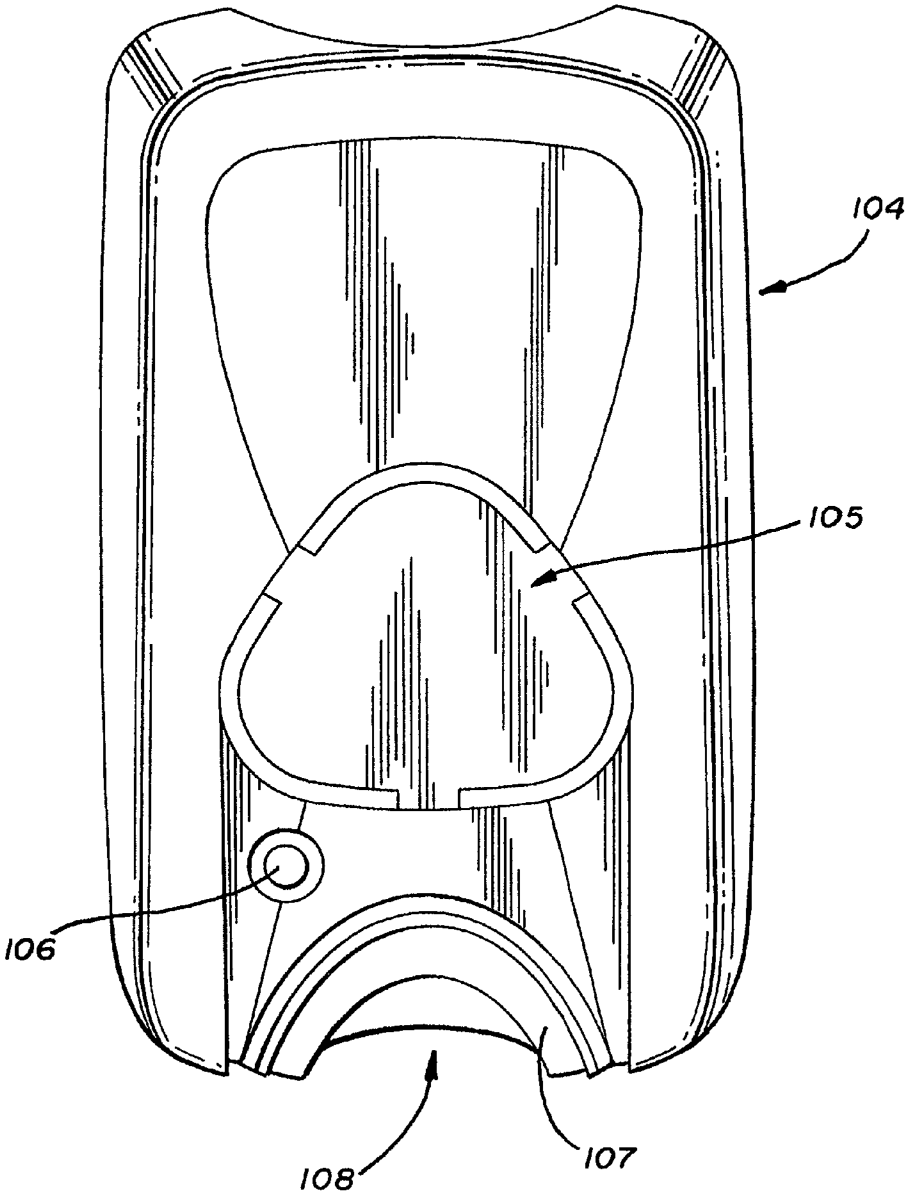
FIG. 1A is a front elevational view of a housing cover of the dispenser.

A detailed view of the housing cover 104 is shown in FIG. 1A. The cover 104 may include an observation window 105 so that the interior of the dispenser 100 can be viewed, if desired. An LED indicator 106 may also extend from the housing, wherein illumination of the indicator 106 shows that the dispenser is on and non-illumination of the LED indicates that the unit is inoperative. The cover 104 also includes a stepped nozzle wall 107 that provides a nozzle opening 108. The wall 107 is configured to provide a series of stepped semi-circular rings as an indication to the user as to where to place their hand so as to receive a measured quantity of fluid. If desired, indica may be provided on the stepped nozzle wall to further assist the user in hand placement.

Received in the housing is a refill container 110 having an identification collar 112. Together, the container 110 and the collar 112 are received by a module, which is designated generally by the numeral 120. The module 120 includes a battery compartment 122 that carries a battery or plurality of batteries for the purpose of powering a motor 124 which is also maintained by the module. It will also be appreciated that the module 120 may be powered directly but it is believed that the use of batteries is preferred. A pump actuator, designated generally by the numeral 126, is also carried by the module 120 for the purpose of engaging the refill container in a manner that will be described in detail. The pump actuator includes linkage and a drive assembly that is connected to the motor 124.

Figure 2:
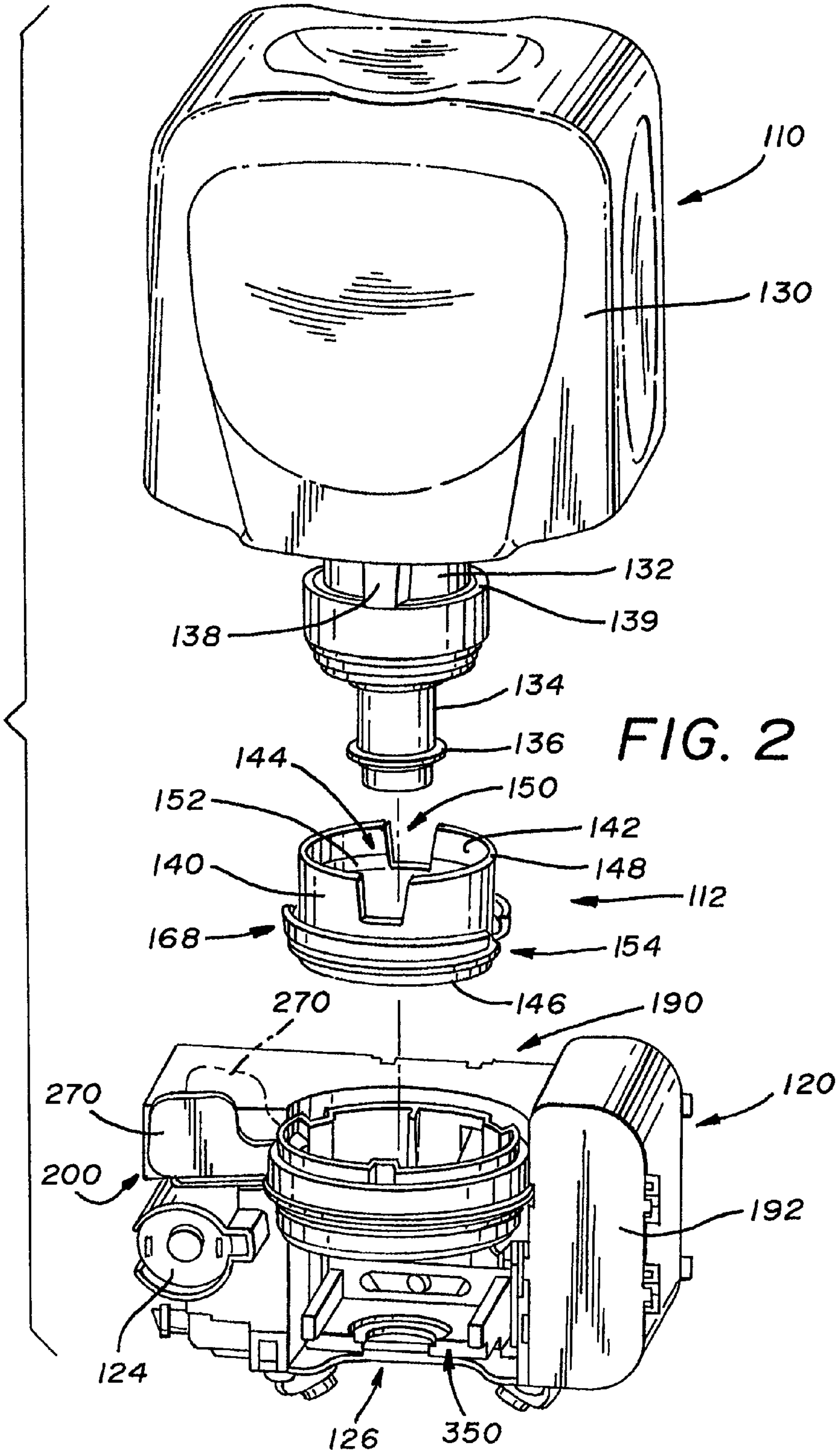
FIG. 2 is an exploded view of the dispenser showing a module, an identification collar, and a refill container.

The refill container is designated generally by the numeral 110 and is seen in an uninstalled position in FIG. 2 and an installed position in FIG. 1. The container 110 includes an enclosure 130 which retains the material to be dispensed by the system. The material may be a fluid, lotion, aerosol, powder or pellets as deemed appropriate by the end application. Extending downwardly from the enclosure 130 is a neck 132 from which further extends a nozzle 134. A pump mechanism 136 is associated with the nozzle 134 and is actuated by an axial motion. The pump mechanism may provide a radially extending nozzle rim 137. It will be appreciated by those skilled in the art that the pump mechanism 136 could be a pump dome or other actuating means typically used for dispensing material from a collapsible enclosure. Collectively, the pump mechanism and the nozzle may be referred to as a dispensing interface. Indeed, the interface is that part of the refill container or the like which carries the dispensable material and coacts with the dispensing system housing. In other words, the interface permits receipt of the container in the housing and assists in dispensing of the material in any form. Extending from the neck 132 may be at least one orientational tab 138. Indeed, the neck may incorporate two orientational tabs 138 that are diametrically opposed to one another. However, the orientation of the tabs 138 may be adjusted for the purpose of accepting different types of collars 112. The neck 132 also provides a locking edge 139.

Figure 2A:
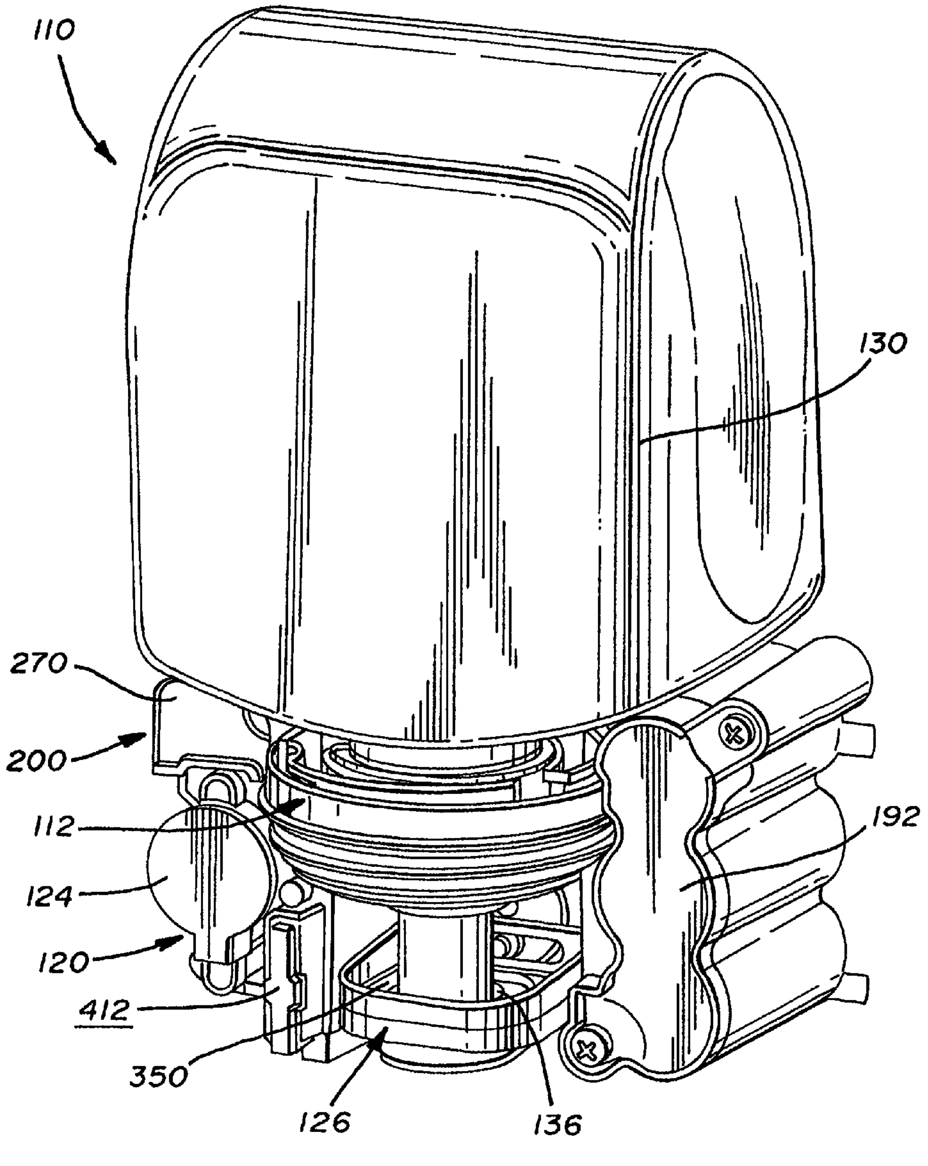
FIG. 2A is a perspective view of an alternative embodiment of the dispenser.

FIG. 2A shows an alternative embodiment of the module 120. The notable differences between the module shown in the other Figs. and the module 120 shown in FIG. 2A is that the pump actuator 126 completely surrounds the pump mechanism. And the module 120 carries the control circuitry which will be discussed in detail later, that includes a key opening to receive an electronic key 412. The key 412 may be color coded or otherwise identified so as to allow visual confirmation that the refill container, with a corresponding visual identification, is compatible with the key.

Figure 3:
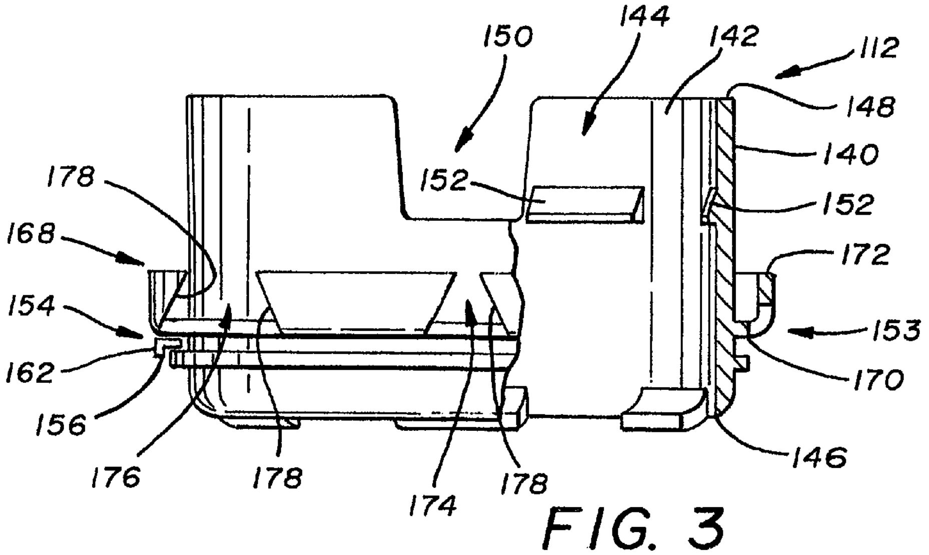
FIG. 3 is a front elevational view, in partial cross-section, of the identification collar.
Figure 4:
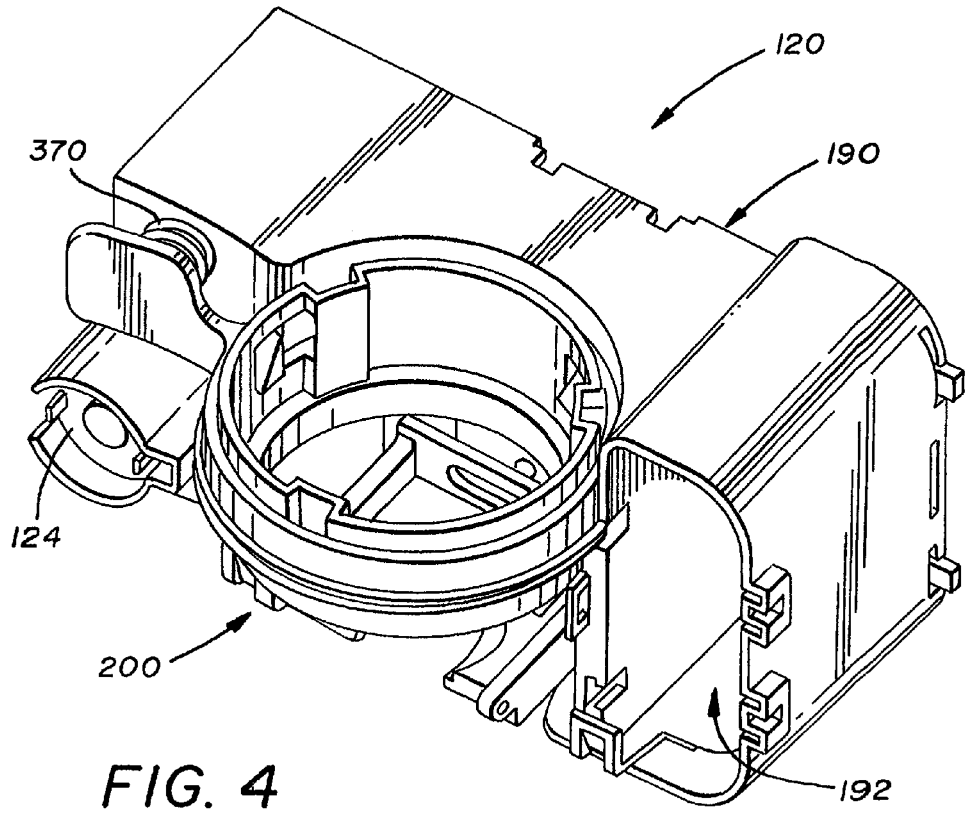
FIG. 4 is a front right perspective view of the module with a slide ring and a mounting ring installed.

The collar, which is designated generally by the numeral 112 and is best seen in FIGS. 2 and 3, is associated with the refill container for the purpose of identifying the container to be used in a particular dispensing system. The collar 112 includes an exterior surface 140 opposite an interior surface 142. The collar 112 has a collar opening 144 extending therethrough and is coaxial with the nozzle 134 when the collar is installed onto the neck 132. The exterior and interior surfaces 140, 142 are connected at an underside of the collar 112 by a chamfered nozzle edge 146 and at a top side by a neck edge 148. A pair of opposed notches 150 are formed in the neck edge 148 and are aligned to receive the corresponding orientational tabs 138 provided by the container. A plurality of internal detents 152 extend radially inwardly from the interior surface 142 and are deflected by the neck 132 as it passes through the opening 144. When the neck 132 travels far enough, the underside of the detents 152 bear against the locking edge 139. Accordingly, the collar 112 secures itself to the neck 132 and is difficult to remove once installed. In other words, when the collar 112 is installed on the container, the notches 150 align with the tabs 138 so as to allow for engagement of the detents with corresponding surfaces on the neck and/or the enclosure 130.

Figure 15:
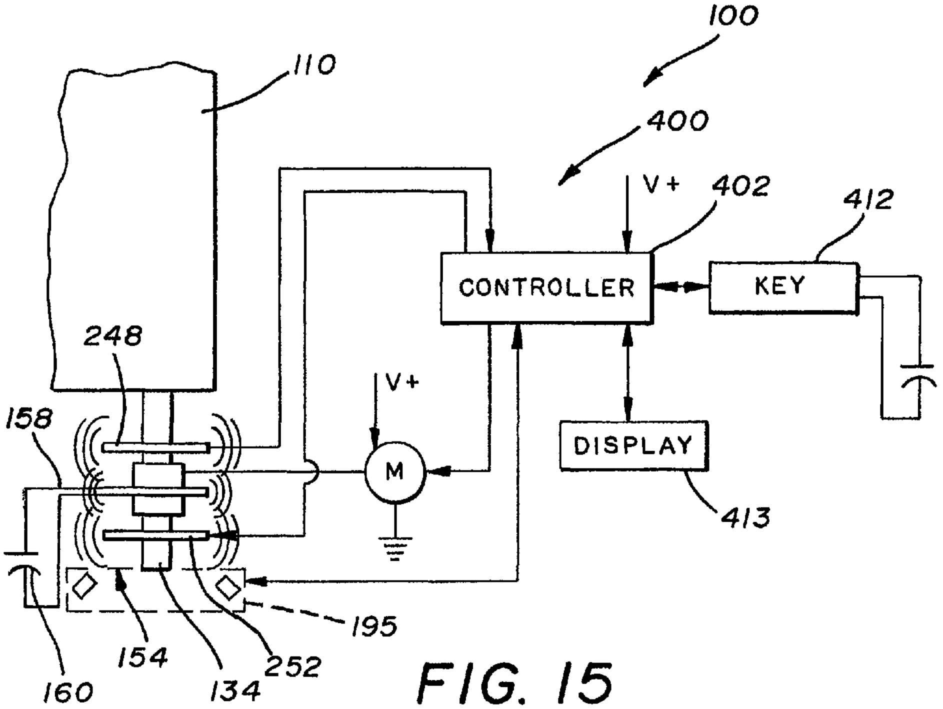
FIG. 15 is a schematic diagram of the keyed fluid dispenser.

Carried on the exterior surface 142 between the nozzle edge 146 and the locking edge 139 is a channel 153 that carries an identifier 154. As used herein, the term identifier is used to identify or associate a tag, a mark or other distinctive feature or characteristic with an enclosure. The identifier allows for identification of the material in the enclosure and the associated pump mechanism. The identifier 154 carries a key 156 in a plastic or other type of enclosure. The key 156 includes an identifier coil 158 that is terminated by an identifier capacitor 160 as seen in FIG. 15. The identifier ring 154 includes an outer diameter 162 which is appropriately sized to be received by the module 120. And the identifier ring 154 may be color coded or provide some other indicia so as to provide a visual match with the key 412. In other words, although the key provides a way of electronically ensuring that the refill container is approved for use with a particular dispenser, color coding of the key 412 and the ring 154 may provide an immediate visual indication of an incompatability problem.

The exterior surface 140 includes a circumferential locking ridge 168 which interacts with the module 120 for the purpose of retaining the refill container 110 in a manner to be described. The locking ridge 168 includes a leading edge 170 that is disposed between the mark ring 154 and the detents 152. The locking ridge 168 also provides a trailing edge 172 that extend toward the notches 150. The locking ridge 168 is periodically interrupted by openings and in particular by an alignment slot 174. In this embodiment only one alignment slot is required although it will be appreciated that multiple alignment slots could be used. Moreover, the single alignment slot 174 is substantially aligned with one of the notches 150. Accordingly, when the identification collar is attached to the refill container the alignment slot is oriented appropriately with respect to the container. The locking ridge 168 also includes a plurality of ramp slots 174 which are uniformly disposed about the locking ridge 168. In this embodiment the locking ridge provides three ramp slots 174 although two, four or more ramp slots could be employed. Each ramp slot 174 is defined by a pair of opposed ramp edges 178 in the locking ridge 168. It will be appreciated that the ramp edges are tapered in such a way that they extend from the leading edge to the trailing edge and are opposed to one another so that the ramp slot is wider at the leading edge than at the trailing edge 172.

Referring now to FIGS. 4-8, it can be seen that the module 120 is configured to selectively carry and retain the refill container 110 while also implementing the detection of an end-user's hands, confirming the compatibility of the container 110 with the dispenser housing, and moving the pump actuator 126 for dispensing material in the enclosure 130 through the nozzle 134. The module 120 provides a body 190 that includes a battery compartment 122 for carrying the batteries, a circuit housing 194 for carrying a communication system (to be discussed), infrared sensors 195 for detecting a user's hands, and a gear box 196 or drive assembly that carries the motor 124 and the appropriate linkage to drive the pump actuator 126. Although the sensors could be of any type able to detect the presence of an object without a mechanical stimulus, this embodiment employs infrared sensors. As will be discussed later, the sensors 195 undergo a self-check to adjust for the relative environment in which the dispenser is received. The body 190 also carries a container release mechanism 200 which is utilized for the purpose of receiving and holding the refill container in the module 120. The container release mechanism 200 allows for insertion and holding of the refill container during use wherein the container is positively locked into place. The mechanism provides for actuation of a lever to allow for withdrawal of the container after its contents have been fully dispensed.

Referring now to FIGS. 9-14, it can be seen that the container release mechanism is designated generally by the numeral 200. The container release mechanism includes a mounting ring 210 that is fixed to the body 190 and a slide ring 212 which is rotatably received on the mounting ring 210 and coacts therewith to align and positively hold the refill container upon its receipts. The slide ring 212 also allows for release of the container upon user-actuated rotation of the slide ring. The rings 210 and 212 also provide for interaction with the identification collar to enable use of the dispensing system.

Figure 9:
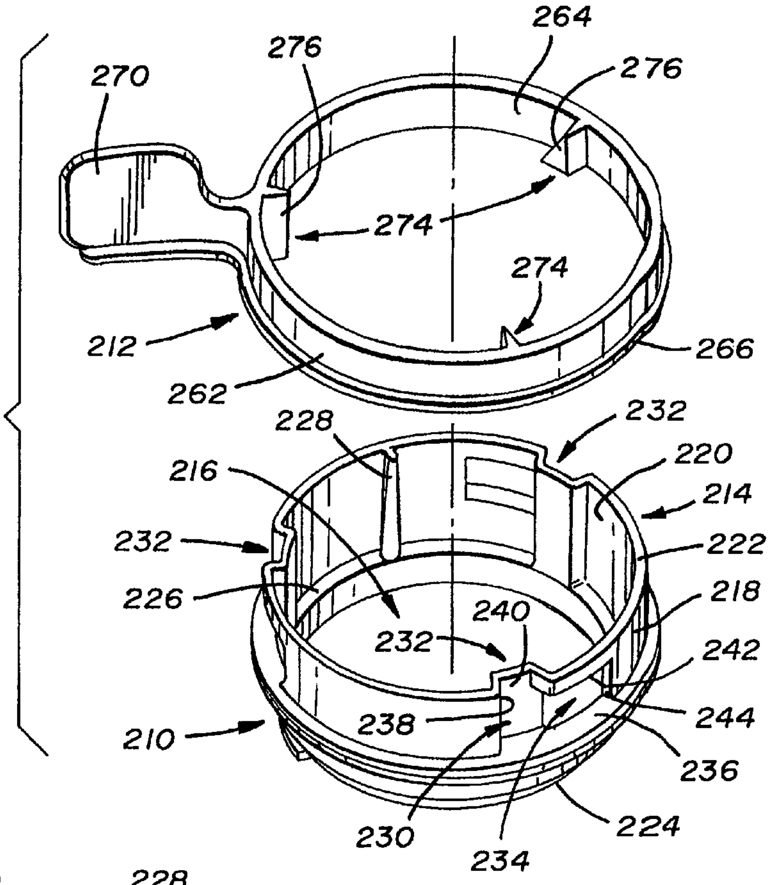
FIG. 9 is an exploded perspective view of the slide and mounting rings.

As best seen in FIG. 9, the mounting ring 210 includes a band 214 which has a band opening 216 therethrough. The band provides an exterior surface 218 opposite an interior surface 220. The surfaces 218 and 220 are connected at their respective ends by a container edge 222 which is opposite a body edge 224. An internal step 226 is formed on the interior surface 220 and which may provide a bearing surface for the identifier 154 as will be later described. Extending axially along the interior surface 220 from the internal step 226 is an alignment rib 228. The alignment rib is ultimately received in the alignment slot 174 of the identification collar 112. The exterior surface 218 of the band 214 provides a plurality of lock channels 230, wherein the lock channels 230 extend from the container edge axially then laterally. In particular, the lock channel includes an axial channel 232 which is contiguous with a lateral opening 234. A slide ring ledge 236 radially extends from the exterior surface 218 and defines the bottom surface of the channel 232 and the opening 234. Accordingly, the channel 232 is defined by an axial channel end wall 238 that is substantially perpendicular to an axial channel side wall 240. In a similar manner, the lateral opening 234 is formed by a lateral opening side wall 242 and a lateral channel end wall 244 which perpendicularly extends from the slide ring edge 236.

Figure 14:
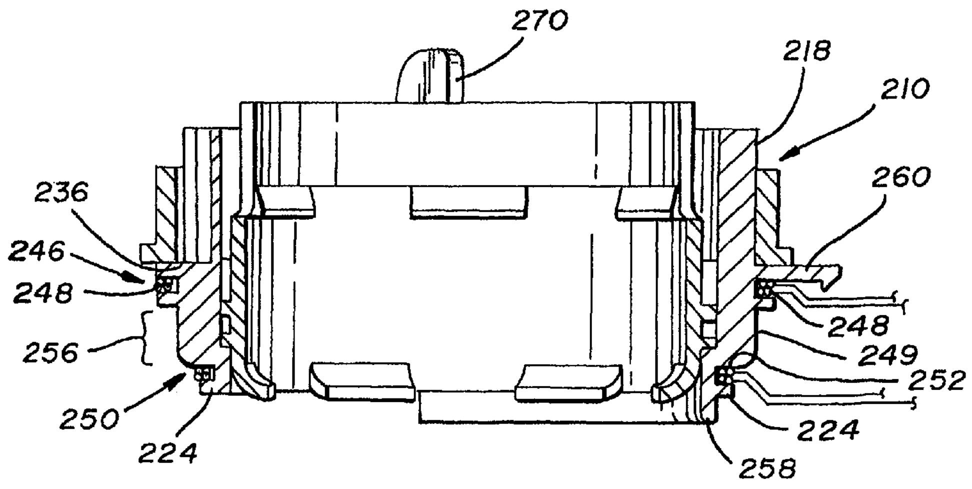
FIG. 14 is a cross-sectional view taken along lines 14-14 of FIG. 13 showing the identification collar and the release mechanism engaged with one another.

Immediately beneath the slide ring ledge 236, as best seen in FIG. 14, is a receive ring 246 which is formed between the ledge and the body edge 224. Wrapped around the receive ring 246 is a receive coil 248 that may be enclosed in a plastic material. The receive coil 248 is a wire that is wrapped around the ring 246 a predetermined number of times and wherein two ends of the wire extend from the coil 248 for connection to the communication system. Extending further axially from the receiving ring 246 is a gap surface 249 that forms a part of the exterior surface 218. Immediately beneath the gap surface 249 is an emit ring 250 that terminates at the body edge 224. Wrapped around the emit ring 250 is an emit coil 252 which also has a predetermined number of turns and wherein the ends of the coils extend therefrom for connection to the communication system. It will thus be appreciated that the gap surface 249 between the receive coil 248 and the emit coil 252 forms a coil gap 256. This gap is primarily defined by the positioning of the identifier coil 158 upon insertion of the refill container into the release mechanism 200. Details of the interaction between the identifier coil and the receive and emit coils will be discussed as the description proceeds. Radially extending from the body edge 224 is a mounting rim 258 which aligns and mates with the body 190. Also extending from the exterior surface and typically from above the receive ring 246 is a mounting tab 260 that extends radially outwardly so as to allow for attachment of the release mechanism to the body 190.

The slide ring 212 includes an exterior surface 262 and an interior surface 264. Extending radially outwardly from the exterior surface 262 at one edge thereof is an exterior ridge 266. A push lever 270 extends from the exterior surface 262 wherein a back surface of the lever 270 includes a spring nub 272. Extending radially inwardly from the interior surface 264 are a plurality of alignment locks 274. In this embodiment three alignment locks are employed but it will be appreciated that any number could be employed as long as the number corresponds with the number of lock channels 230 provided by the mounting ring 210. Each of the alignment locks 274 have a lock ramp 276 that angularly extends from the bottom of the ring toward the top of the ring. It will be appreciated that the inner diameter of the interior surface 264 is somewhat larger than the other diameter of the exterior surface 218 of the band 214.

Figure 10:
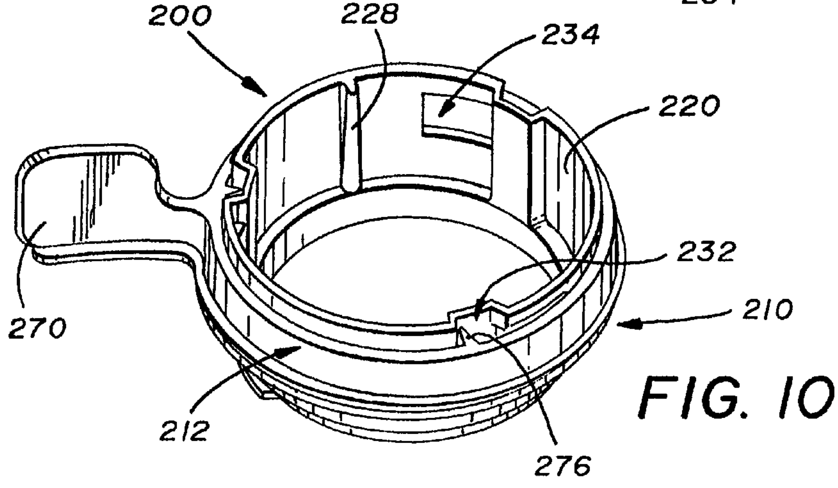
FIG. 10 is a perspective view of the slide ring and the mounting ring assembled to one another in pre-assembled position.
Figure 11:
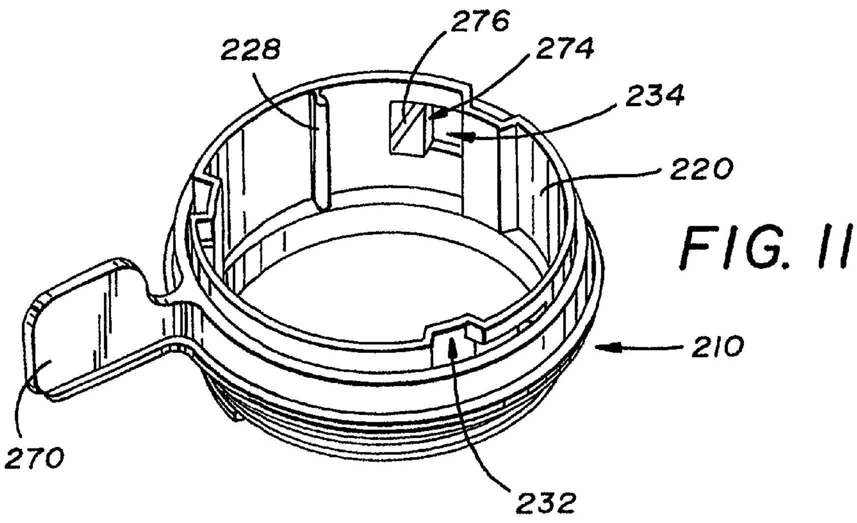
FIG. 11 is a front perspective view of the slide ring and mounting rings after assembly to one another.
Figure 12:
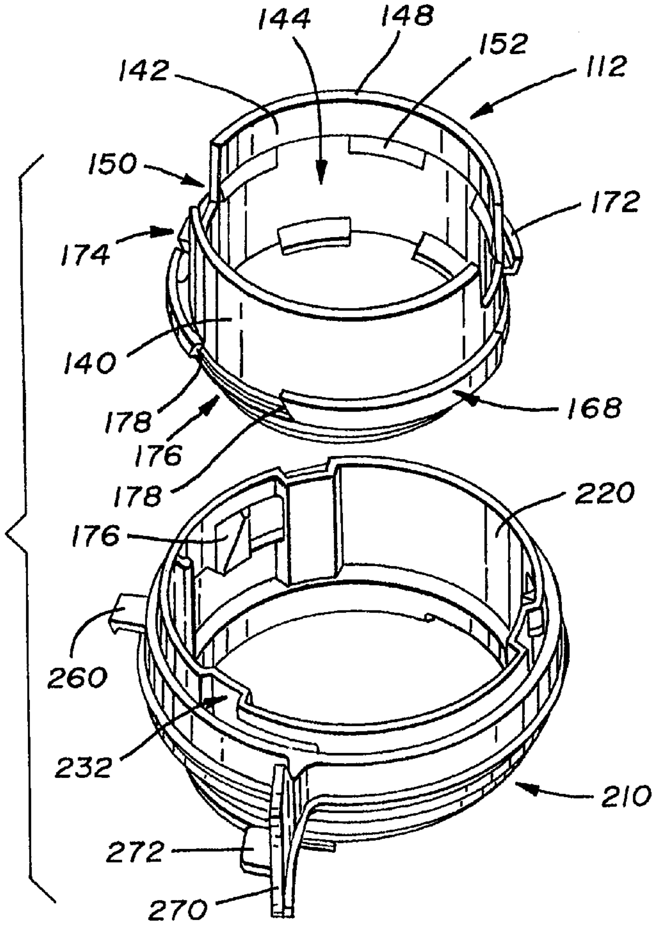
FIG. 12 is a perspective view showing the identification collar (without the refill container) and the slide ring and mounting ring assembly oriented with respect to one another.
Figure 13:
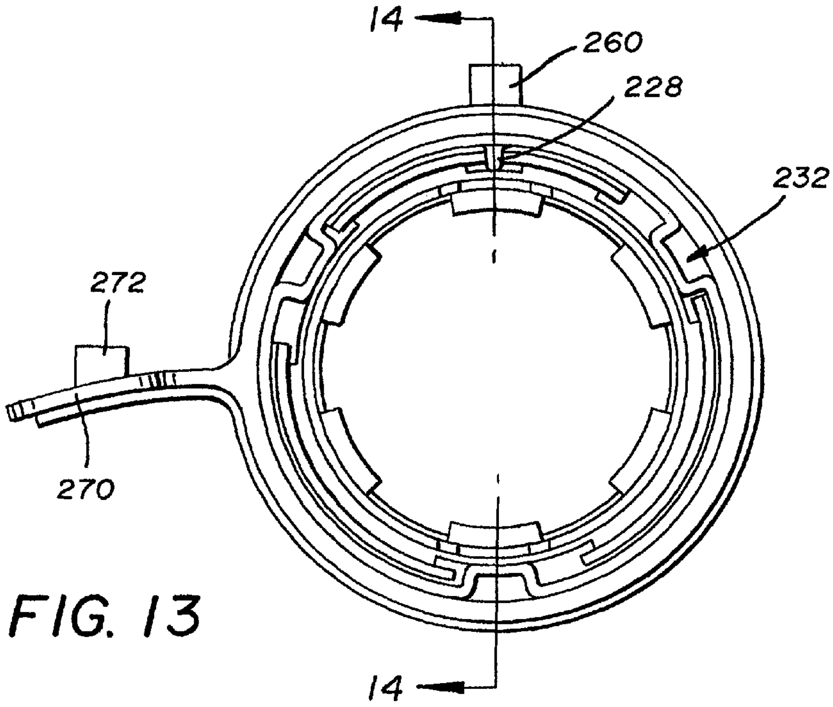
FIG. 13 is a top view of the view of the identification collar (without the refill container) and the container release mechanism.

Referring now to FIGS. 10 and 11, it can be seen that the slide ring 212 is axially and slidably received upon the mounting ring 210. In particular, it will be appreciated that the alignment locks 224 are alignable with a corresponding lock channel 230 and in particular the axial channel 232. As such, the slide ring ledge 236 is rotatable upon the exterior ridge 266. As best seen in FIG. 11, it will be appreciated that the slide ring may then be rotated counter-clockwise such that the alignment locks 274 are received in the lateral opening 234. With the alignment locks 274 received within the lateral opening 234, the lateral opening side wall 242 holds the alignment locks in place and prevents the slide ring from being axially removed from the mounting ring. With the slide ring assembled to the mounting ring, the release mechanism may be then installed into the body 190. The details of receipt of the identification collar within the release mechanism will be discussed after a further explanation of the module 120 and its relationship with the release mechanism.

Referring back to FIGS. 4-8, it can be seen that the module 120 includes a body designated generally by the numeral 190. The body includes a back wall 300 which provides a tab opening 302 for receiving the mounting tab 260 of the mounting ring. Extending substantially perpendicularly from the back wall 300 are a pair of opposed side walls 304. A mounting rim 306 extends from the back wall 300 and the side walls 304 and is configured to be received in the mounting channel 258 provided by the band 214. The mounting rim 306 provides an emit coil step 308 which bears on the mounting ring at the emit ring 250. Extending substantially perpendicularly from the emit coil step 308 is a receive coil step 310 and from which extends a ridge step 312. Extending from one of the side walls 304 is a slide ring channel 314. Accordingly, these steps and channels all conform to the exterior rings and coils of the mounting ring and slide ring such that the release mechanism may be slidably supported by the body 190 and so that the mounting tab 260 can be received in the tab opening 302. It will be appreciated that the mounting tab is partially deflected upon insertion into the opening and upon clearing the thickness of the back wall 300 allows for the release mechanism to be retained by the module 120. Upon completion of the insertion, the positioning of the alignment rib and the slide ring is such that the locking ramps are in a position to allow only partial rotation of the slide ring such that the locking ramps are never again aligned with the axial channel 238. Accordingly, once the release mechanism is installed into the module, the slide ring is fixed into position and can only rotatably moved a limited amount as defined by the length of the lateral channel. This is further facilitated by the fact that the push lever 270 is stopped by the body 190 in one rotational direction and that the locking channels bear against the lateral channel end wall 244 in the other rotational direction.

The back wall 300 includes a pair of opposed rail openings 320 which receive the pump actuator mechanism 126. The back wall further provides a gear opening 322 therethrough which receives a component of the gear box 196.

Figure 5:
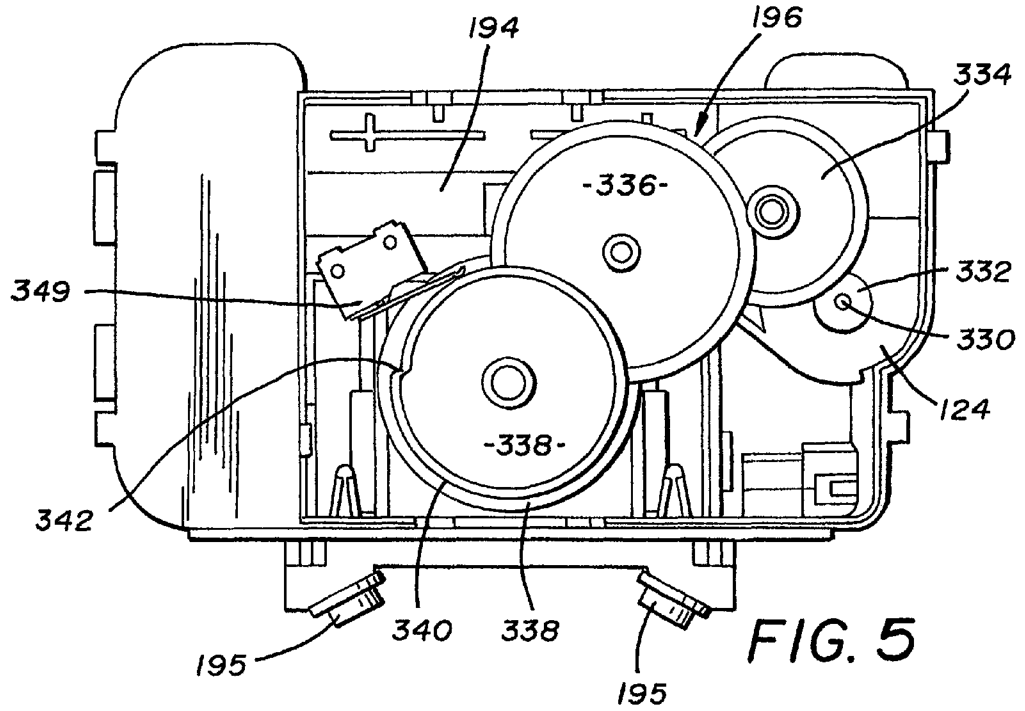
FIG. 5 is a rear elevational view of the module.
Figure 6:
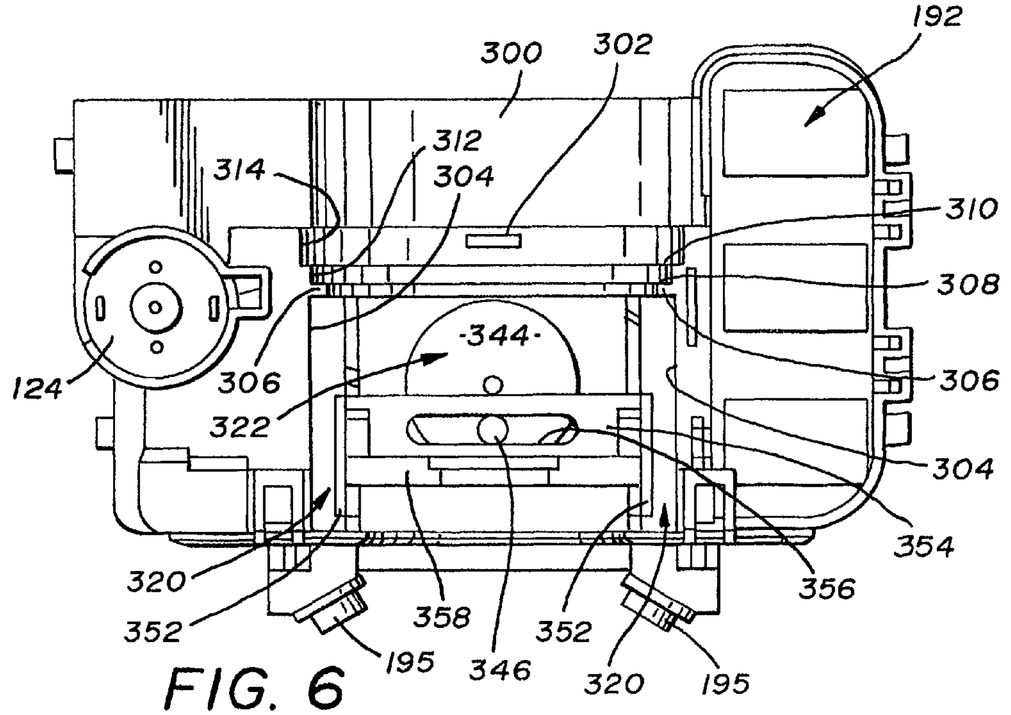
FIG. 6 is a front elevational view of the module with the slide ring and the mounting ring not shown.
Figure 8:
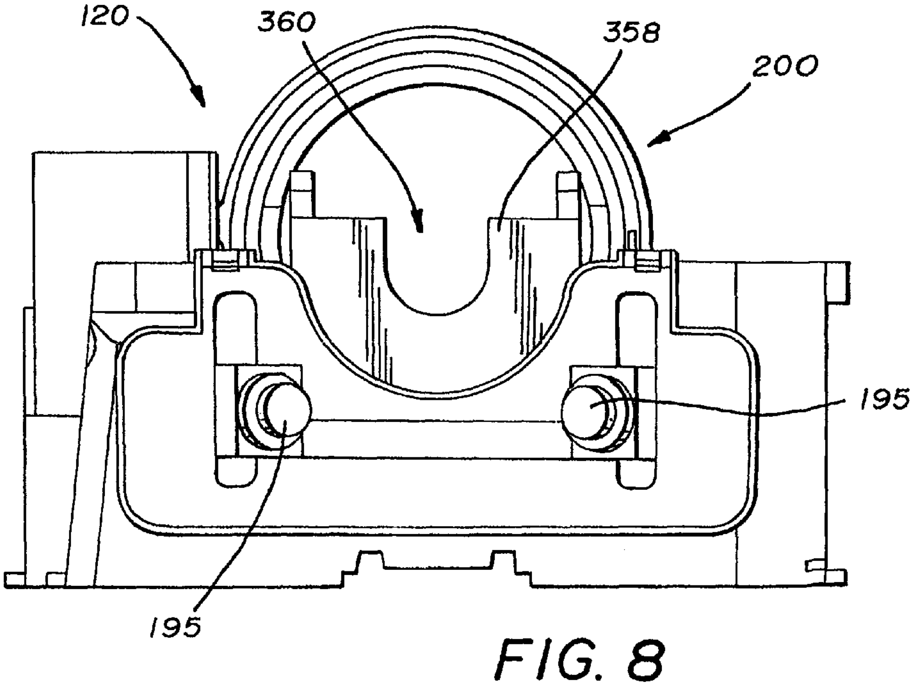
FIG. 8 is a bottom view of the module.

As best seen in FIG. 5, the gear box or drive assembly, which is generally designated by the numeral 196 carries the motor 124 which has a rotatable motor shaft 330. A series of gears allow for rotatable movement by the motor shaft to actuate or move the pump actuator 126. In particular, the motor shaft 330 provides a shaft gear 332 that is engaged by an internal gear A 334 which drives an internal gear B 336. The internal gear 336 further meshes with a cycle gear 338 that provides a cam surface 340 and which in turns provides a cam actuator 342. A drive gear 344 is directly connected to the cycle gear 338 and provides a drive post 346 that extends into the gear opening 322. A microswitch 349 is coupled to the cycle gear and in particular, a contact of the microswitch bears along the cam surface 340. As the cycle gear 338 rotates, the microswitch is actuated by the cam actuator 343 and generates an appropriate electrical signal so that the system knows when a full rotation of the cycle gear has been completed.

As best seen in FIGS. 2,4 and 6-8, the pump actuator 126 includes a tray designated generally by the numeral 350. Extending from both sides of the tray 350 are a pair of opposed slide rails 352 which are slidably received in the rail openings 320. The tray 350 includes a drive wall 354 which has a drive slot 356 therethrough. It can be seen that the drive post 346 extending from the drive gear 344 is received in the drive slot. Extending perpendicularly from the drive wall 354 is a nozzle plate 358 which provides a nozzle hollow 360. Briefly, when the refill container is positioned within the release mechanism, the nozzle hollow 360 is engaged with and/or by the pump mechanism 136. Accordingly, when the communication system is actuated so as to initiate a dispensing cycle it rotates the motor shaft to drive the gears in the appropriate direction and as such the drive post 346 is rotated about the drive gear 344. As the drive post 346 is rotated it engages the drive slot 356 and moves the drive wall 354 in an up/down direction. As this occurs the nozzle plate is driven up and down in a corresponding direction so as to engage the pump mechanism 136 and as such a desired quantity of fluid is dispensed out the nozzle 134. To complete the assembly of the release mechanism to the module 120 it will be appreciated that a spring 370 is interposed between the lever nub 272 and the body 190. Of course, other biasing mechanisms could be employed to bias the slide ring with respect to the body wall.

Figure 7:
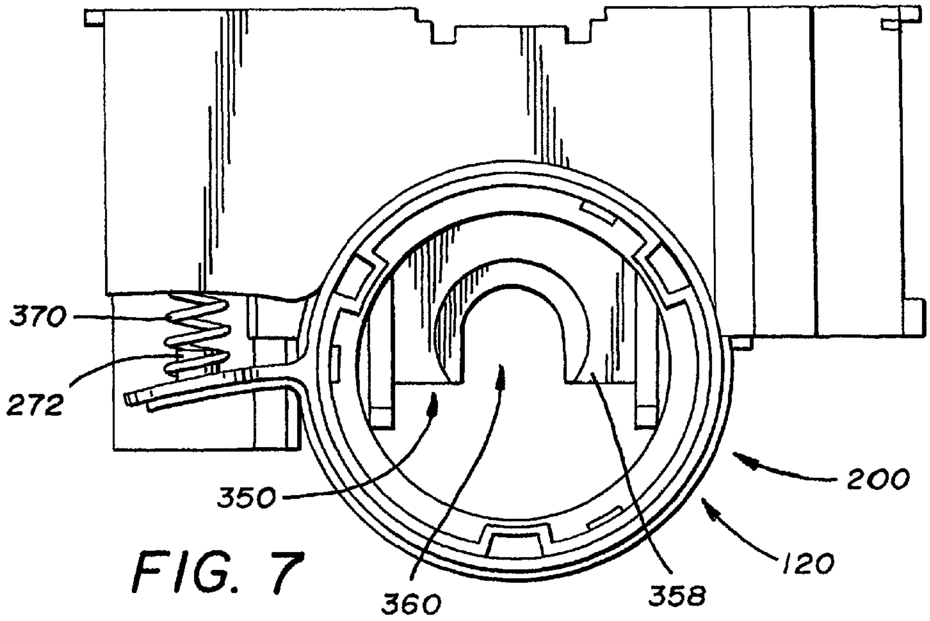
FIG. 7 is a top view of the module.
Figure 7A:
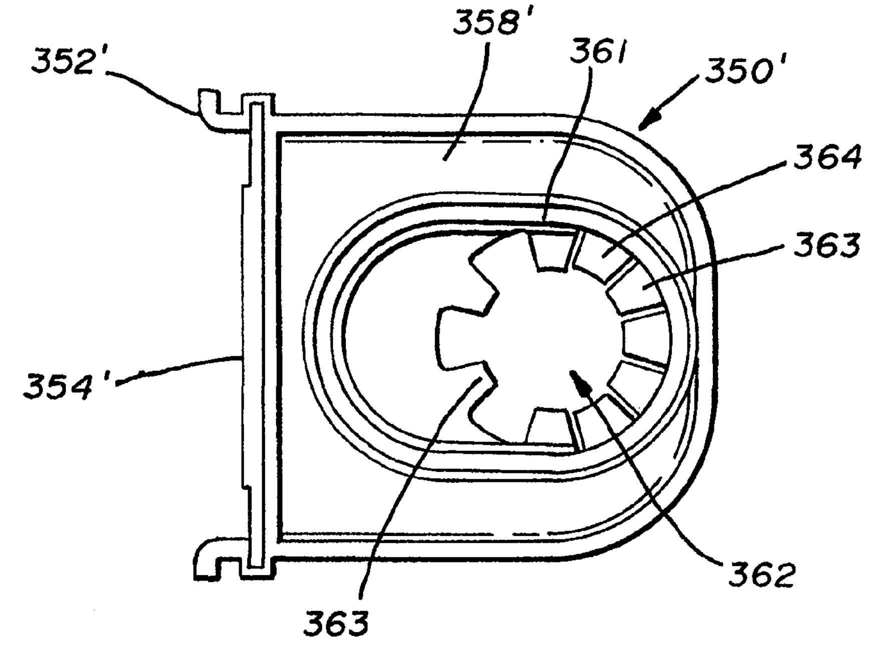
FIG. 7A is a top view of an alternative tray used with the pump actuator.
Figure 7B:
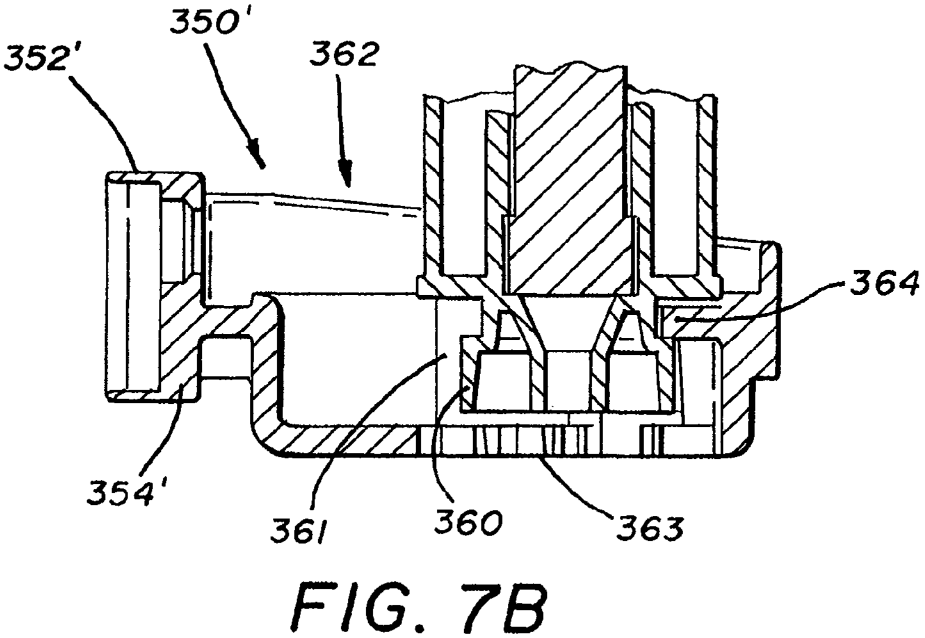
FIG. 7B is a cross-sectional view of the alternative tray and a refill container nozzle received therein.

Referring now to FIGS. 7A and 7B, it can be seen that an alternative tray is designated generally by the numeral 350'. The tray 350' operates in much the same manner as the tray 350; however, the tray 350' provides a positive action on an upstroke or dispensing cycle of the nozzle and also on the return or down stroke after a quantity of fluid has been dispensed. As in the original tray embodiment, the tray 350' includes a pair of opposed slide rails 352' connected to one another by a drive wall 354'. The slide rails 352' are slidably received in the rail openings 320. The drive wall 354' provides a drive slot 356' which receives the post 346. Perpendicularly extending from the drive wall 354 is a nozzle plate 358' from which extends a nozzle collar 361. Extending through the nozzle collar 361 is a nozzle opening 362 which is similar to the nozzle hollow 360. The nozzle extending from the refill container is received within the nozzle opening 362 upon installation of the refill container. Extending radially inwardly from the nozzle collar 361 are a plurality of lift tines 363 are positionable below the nozzle rim 137 upon installation of the refill container. In a similar manner, a plurality of push tines 364 extend radially inwardly from the nozzle collar 361; however, the push tines are only disposed about one half of the nozzle opening 362. The push tines 364 are positioned above the nozzle rim 137 upon installation of the refill container.

As noted previously, the identification collar 112 is attached to the refill container 110. Each refill container is specifically identified by associating identification collar 112 which has a predetermined identifier ring associated therewith. The importance of the identifier ring will be discussed in further detail below. In any event, the identification collar 112 is aligned such that the neck 132 and nozzle 134 are directed through the collar opening 144. The detents 152 are at least partially deflected by the neck 132 until they clear and then engage the locking edge 139. Accordingly, the identification collar is secured to the neck 132. It will be appreciated that when aligning the identification collar with the refill container the orientational tabs 138 are aligned with the notches 150. Accordingly, the alignment slot 174 is oriented with respect to the refill container 110 such that it can be received in the release mechanism. It will be appreciated that the identification collar 112 is installed by the manufacturer of the fluid contained in the refill container or may be installed at another location by a distributor if desired.

After the housing is properly installed, the initial loading of the refill container is as follows. The refill container 110 is oriented such that the alignment slot 174 is directed onto the alignment rib 228. After this initial alignment has taken place the ramp edges 178 are appropriately positioned so as to engage the lock ramps 276. Accordingly, as an axially downward force is applied to the refill container, the ramps 276 engage the ramp edges 178. This causes the slide ring to be deflected and to slightly rotate against the spring 370. In other words, the downward axial movement of the identification collar causes partial rotational movement of the slide ring. This causes the lock ramps 276 to move in the corresponding lateral openings 234 until such time that the ramps 276 no longer engage the respective ramp edge 178. When this occurs, the slide ring rotates back to its original position and locks the refill container into place. In particular, the underside of the lock ramps 276 engage and hold onto the locking ridge 168 and in particular bear against the trailing edge 172.

It will be appreciated that once the refill container is held in place by the release mechanism that the orientation of the mark coil is in a plane parallel to that of the receive coil and the emit coil 252 and, in particular, the mark key is received within the coil gap 256. This alignment is maintained even during the cycling of the drive assembly so as to initiate a dispensing of fluid from the container.

After the fluid contained within the refill container has fully depleted, the user opens the cover of the housing and depresses the push lever so as to slidably rotate the slide ring. This moves the lock ramps 276 into a position aligned with the ramp slots 176. While maintaining pressure on the push lever and so as to maintain the positioning of the lock ramps with respect to the slots, the user may then axially remove the refill container from the release mechanism. The release mechanism is then ready to receive a new refill container as described above. With the refill container properly received in the release mechanism it will be appreciated that the mechanism 136 is engagable by the nozzle plate 358. In particular, the nozzle hollow 360 partially or completely surrounds the nozzle and/or pump mechanism 136.

The identifier key 156 also provides the outer diameter surface 162 which, when the refill container is received within the collar opening 144, allows for proximal or adjacent positioning of the surface 162 with respect to the ring surface 246. It will further be appreciated that the identifier coil 156 fits within the coil gap 256 and is in a coaxial and parallel relationship with, and is uniformly disposed between, the emit and receive coils. In order to fit between the emitting and receiving coils, it will be appreciated that the identifier—which at least includes the identifier coil 156 and the identifier capacitor 160—is spaced apart from the enclosure. Although the mark is coaxially oriented with respect to the pump mechanism and the nozzle, it will be appreciated that the identifier may be spaced apart from other surfaces of the enclosure so long as the identifier coil is operative with the emitting and receiving coils.

An optimum position of the identifier coil is a parallel spatial relationship between the emit and receive coils. In addition to providing alignment between the coils, the positional relationship of the coils facilitates efficient and minimal use of battery power. Indeed, the emitting coil requires about 0.02 Watts of power to operate over a frequency range of 10 Hz to 10K Hz. This frequency range allows for an unlimited number of identifier keys to be employed. In other words, the frequency range can be subdivided to obtain any number of keys. Of course, any frequency range or bandwidth could be specified. As such, each identifier capacitor has its own selected frequency range within the operational range. Of course, other power requirements and frequency ranges could be employed, but it is believed that the selected parameters provide for optimal operation of the system 100. It will further be appreciated that use of a spaced apart coil that is associated with emitting and receiving coils could be configured with any dispensable product. For example, a roll of paper towels could be held by a carrier from which extends the spaced apart mark coil. The carrier would interface with the housing and would maintain the emitting and receiving coils and dispense an appropriate length of paper towel when an appropriate signal is received.

Referring now to FIG. 15, it can be seen that the system 100 includes a communication system 400 which includes the emitting coil and the receiving coil. Also included in the system is a controller 402 which includes the necessary hardware, software, and memory for implementing the present communication system. Coupled to the controller 402 is a key 412 which in the preferred embodiment is a digital key in the form of a printed circuit board with designated interconnections that provides a reference value that is compared to a value or signature generated by the emitting/receiving coils. Alternatively, the key may be a capacitor having a capacitance value that matches the capacitance value of the identifier capacitor 160. It will be appreciated that any electrical component that allows the "tuned frequency" of the energized coil to match a corresponding value in the controller could also be used to enable operation of the system 100. This corresponding value could be arrived at by applying a mathematical function or operation to the detected frequency to confirm its use within the system 100. In the present embodiment it is believed that up to ten different capacitor values may be used and that a corresponding digital key or key capacitor value is connected to the controller. To facilitate the assembly process each collar 112 and/or electronic key 412 may be coded with color or a raised indicia according to the capacitance value of the capacitor 160. This provides an easily discernable visual indication of which collar refill container should be associated with any given dispenser. The controller 402 provides operational controls to the motor and a display 413 which may be a liquid crystal display or other low-cost display which provides operating information if required.

Figure 16:
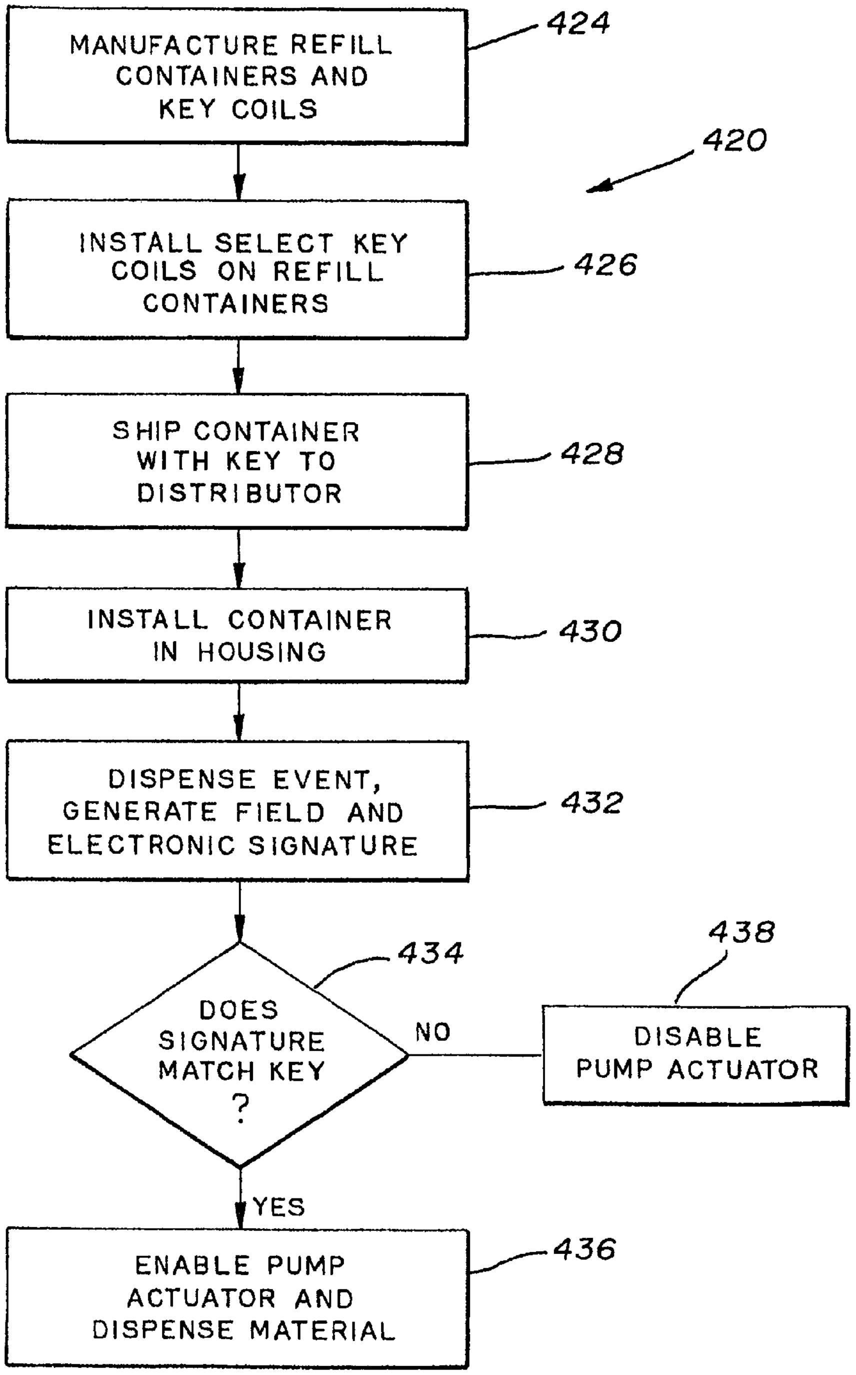
FIG. 16 is an operational flow chart of the fluid dispenser's operation.

Referring now to FIG. 16, an operational flow chart, which sets forth operational steps for the manufacture of the dispensing system and refill containers, and for utilizing the communication system 400, is generally designated by the numeral 420. The flow chart includes a series of manufacturing steps and a series of refill replacement and operational steps. In regard to the manufacturing steps, it will be appreciated that a key capacitor 412 is connected to the controller 402 and is shipped with like dispensing units to a particular distributor. The manufacturer, at step 424, manufactures a number of refill containers and a pre-designated number of identifier coils with an appropriate electronic key and in particular an identifier coil with an attached identifier capacitor. In this way, a large quantity of generic refill containers can be manufactured and stored. When an order is placed, at step 426, the appropriate electronic key may be associated with the refill container simply by installing the collar with a designated key onto the neck of the refill container. Next, at step 428, the assembled refill container with electronic key is shipped to the appropriate distributor. This concludes the manufacturing steps.

For the operational steps, the distributor receives the refill containers with the identifier key and installs them in a designated housing at step 430. Upon the next detection of a dispensing event by the infrared sensors or actuation of a push bar, if appropriate, the controller generates a signal to energize the emit coil which generates a field that is detected by the identifier coil 156. The capacitor 160 associated with the coil in turn generates a unique electronic signature, at step 432, which is detected by the receive coil 248. This near field frequency response is then returned to the controller 310 for comparison to the key capacitor value 412 at step 434. If these values match and are considered to be compatible with one another, the controller allows for actuation of the motor 124 and dispensing of a measured quantity of material at step 436. If, however, the controller does not detect a match the motor is not actuated and the unit is disabled at step 438.

Once the refill container is properly installed and the coils are proximally positioned with one another, use of the dispensing system may be initiated. In this embodiment the user simply places their hands so as to be in a position to be detected by the infrared sensors 195. Upon detection of an object underneath the sensor 195 an appropriate signal is sent to the communication system 400 and in particular the controller 402. As described above the coils are energized and if the receiving coil is in range and detects a valid signal the controller initiates the dispensing cycle by rotating the motor shaft 330. This causes engagement of the drive assembly including the various gears 332-338 so as to initiate rotation of the cam surface 340 and the drive gear 344. Rotation of the drive post 346 causes the tray to move in an up/down direction which, by virtue of engagement with the nozzle causes a dispensing of fluid. The communication system may be programmed so as to allow for multiple rotations of the cycle gear so that multiple dispensing cycles are initiated upon a single detection of an object under an infrared sensor. This count is maintained by the cam actuator being engaged by the microswitch 349.

In the event the alternative tray embodiment is employed, the drive post 346 causes the tray to move in an up/down direction as previously described. However, this embodiment is distinguished in that the lift tines engage an underside of the nozzle rim 137 upon initiation of the dispense cycle and upon completion of the dispense cycle or upstroke of the nozzle rim, the push tines 364 engage a top side of the nozzle rim 137 and push the nozzle downwardly, toward its original position. It will be appreciated that this embodiment is advantageous inasmuch as the pumping mechanism and/or nozzle are returned to their original position so as to ensure proper sequencing of a dispense cycle. Moreover, it has been found that by returning the nozzle to its original position, less material is maintained within the pumping mechanism and as such excess or residual fluid does not interfere with operation of the dispensing mechanism.

Figure 17:
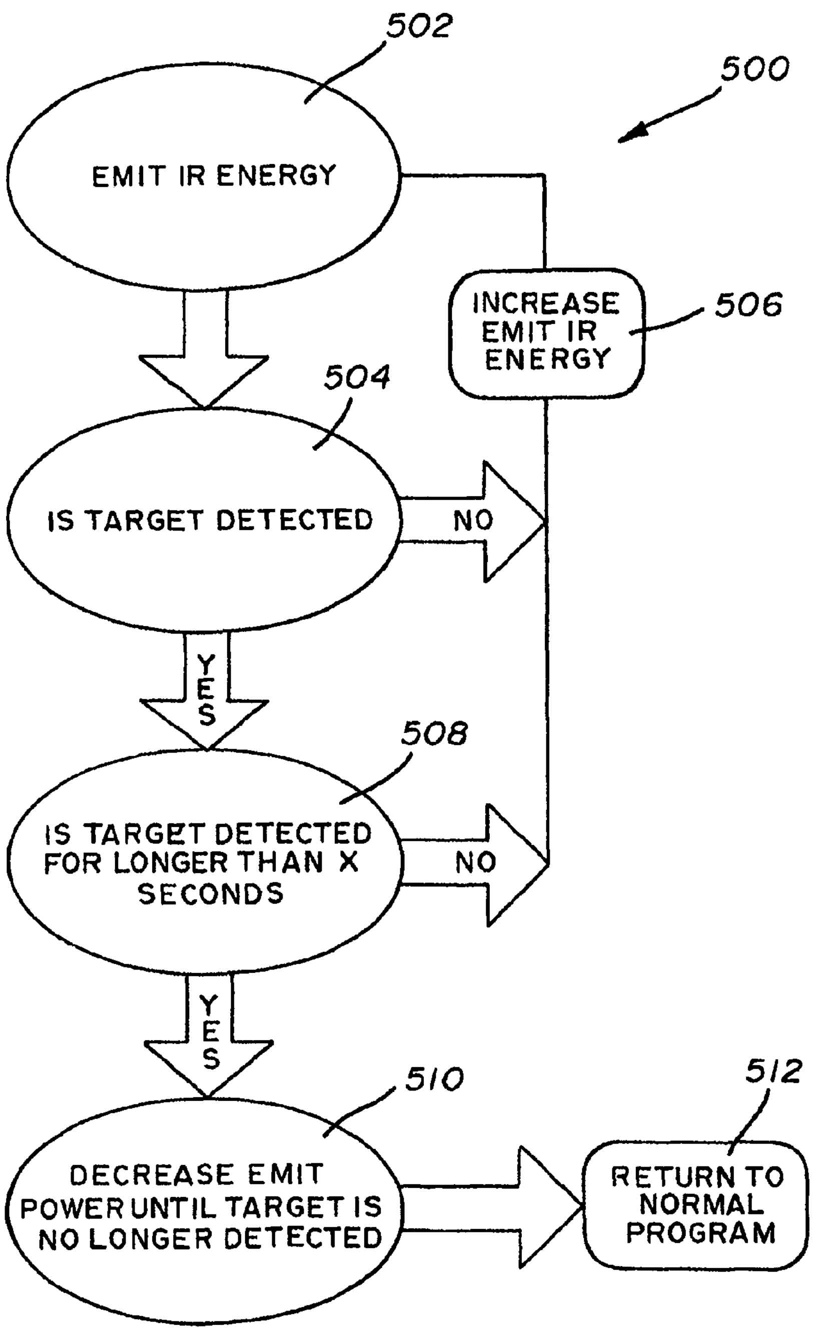
FIG. 17 is an operational flow chart of an auto-ranging feature utilized by hands-free sensors carried by the fluid dispenser.

Yet another feature of the dispensing system is presented in the flow chart shown in FIG. 17 and designated generally by the numeral 500. This sequence of steps is directed to the operation of the infrared sensors 195 and ensures that the positioning of the dispensing system is adaptable to different reflective environments in which it may be installed. It will be appreciated that the dispensing system may be installed in a washroom facility where tile is prevalent and as such the reflective surface of the tile may inadvertently trigger actuation of the hands-free sensors. The reflective nature of the tile may change depending upon the amount of ambient, fluorescent or other type of light that the dispensing system may be exposed to. Accordingly, the infrared sensors, which are connected to the controller 402 periodically execute an auto-ranging routine so as to ensure that the dispensing system operates properly in changing ambient light conditions. At a first step 502, the infrared sensors emit infrared energy. Next, at step 504, the controller observes the return signals received by the sensors and determines whether a target has been detected or not. If a target has not been detected, then at step 506 the sensors increase the amount of infrared energy emitted and the process returns to step 502. Returning to step 504, if a target is detected then the controller proceeds to step 508 to determine whether the target is detected for longer than 10 seconds or some other predetermined period of time. If the target is not detected for longer than 10 seconds, then the process returns to step 506 and the infrared energy amount is increased once again. However, if at step 508 it is determined that the target is detected for longer than 10 seconds or some other predetermined period of time, then at step 510 the amount of power of is decreased until the target is no longer detected. Upon completion of step 510, the process returns to its normal operational mode at step 512.

Based upon the foregoing steps, it will be appreciated that the auto-ranging logic routine executed by the controller and the infrared sensors allows for an automated adjustment of the desired target range used by the dispensing system. Accordingly, this feature is advantageous in ensuring the proper operation of the dispenser in various ambient light surroundings.

Based upon the foregoing the advantages of the present invention are readily apparent. In particular, this configuration allows for elimination of mechanical keys and by the use of the electronic keys so as to reduce inventory of the mechanical keys. The electrically keys are much easier to maintain and are easier to keep in inventory so that they can be used on an as needed basis. Such a configuration also significantly reduces the ability of competitors to "stuff" unapproved refill containers into dispenser housings. This is done by virtue of the selection of coils of the emitting and receiving coils and the mark coil. Yet another advantage of the present invention is that the coils are easily configured to be used with the refill containers and as part of the release mechanism.

Thus, it can be seen that the objects of the invention have been satisfied by the structure and its method for use presented above. While in accordance with the Patent Statutes, only the best mode and preferred embodiment has been presented and described in detail, it is to be understood that the invention is not limited thereto or thereby. Accordingly, for an appreciation of the true scope and breadth of the invention, reference should be made to the following claims.

What is claimed is:

1. A refill container for receipt in a dispensing system, the container comprising:

an enclosure for carrying dispensable material;

a pump mechanism coupled to said enclosure;

a nozzle operatively connected to said pump mechanism, wherein actuation of said pump mechanism dispenses a quantity of material through said nozzle;

a neck extending from said enclosure and carrying said pump mechanism and said nozzle;

a collar disposed around said neck; and an identifier ring comprising a wire coil having a capacitor connected thereto, said wire coil disposed around and coaxial with said collar and said neck and spaced apart a predetermined distance away from said enclosure, wherein said identifier ring has one of a selected number of electronic signatures, wherein said selected number of electronic signatures corresponds to a different number of dispensing systems in which the enclosure can be received, and wherein a value of said capacitor determines said electronic signature.

2. The refill container according to claim 1, wherein said identifier ring is circular.

3. The refill container according to claim 2, wherein said ring is attached to said neck.

4. The refill container according to claim 3, wherein said ring is removable from said neck.

5. The refill container according to claim 3, wherein said ring is permanently secured to said neck.

6. The refill container according to claim 1, wherein said ring is coded according to said capacitor value.

7. The refill container according to claim 6, wherein said ring is color coded according to said capacitor value.

8. The refill container according to claim 6, wherein said ring has tactile indicia corresponding to said capacitor value.

9. The refill container according to claim 2, wherein said identifier generates an electromagnetic signature when an electric field is placed in close proximity thereto.

10. The refill container according to claim 1, wherein said collar has an exterior surface and an interior surface with a collar opening therethrough, said pump mechanism received in said collar opening.

11. The refill container according to claim 10, wherein said interior surface of said collar has at least one detent which secures said collar to said enclosure.

12. The refill container according to claim 10, further comprising:

a locking ridge extending from said exterior surface, said locking ridge having a leading edge and a trailing edge.

13. The refill container according to claim 12, wherein said locking ridge has an alignment slot extending at least from said leading edge toward said trailing edge.

14. The refill container according to claim 13, wherein said enclosure provides at least one orientational tab, and wherein said collar provides a notch for receiving said at least one orientational tab.

15. The refill container according to claim 14, wherein said alignment slot is aligned with said notch.

16. The refill container according to claim 12, wherein said locking ridge has a plurality of ramp slots, each of said ramp slots having at least a ramp edge.

17. The refill container according to claim 16, wherein said locking ridge has an alignment slot spaced radially apart from said ramp slots.

18. The refill container according to claim 1, wherein said identifier ring is spaced apart from said enclosure a uniform distance to allow for communications with the dispensing system.

19. The refill container according to claim 1, wherein said enclosure is characterized by at least one of a protrusion and a recess configured for engagement with a corresponding one of a recess and protrusion in the dispensing system to maintain said identifier ring in an operative position when said refill container is associated with the dispensing system.

20. The refill container according to claim 19 wherein said enclosure is axially received by the dispensing system which results in selective engagement by the dispensing system to retain the enclosure.

21. The refill container according to claim 1, wherein said selected number of electronic signatures substantially span a range of frequencies.

22. The refill container according to claim 21, wherein said range of frequencies is from about 10 Hz to about 10 KHz.

23. The refill container according to claim 21, wherein said range of frequencies is segmented into said selected number of electronic signatures.

24. The refill container according to claim 23, wherein at least one of said selected signatures in said range of frequencies is generated upon exposure to an electric field.

* * * * *